No. 886,059. PATENTED APR. 28, 1908.
M. JORSTAD.
TENDER FOR TRACTION ENGINES.
APPLICATION FILED APR. 25, 1907.
2 SHEETS—SHEET 1.
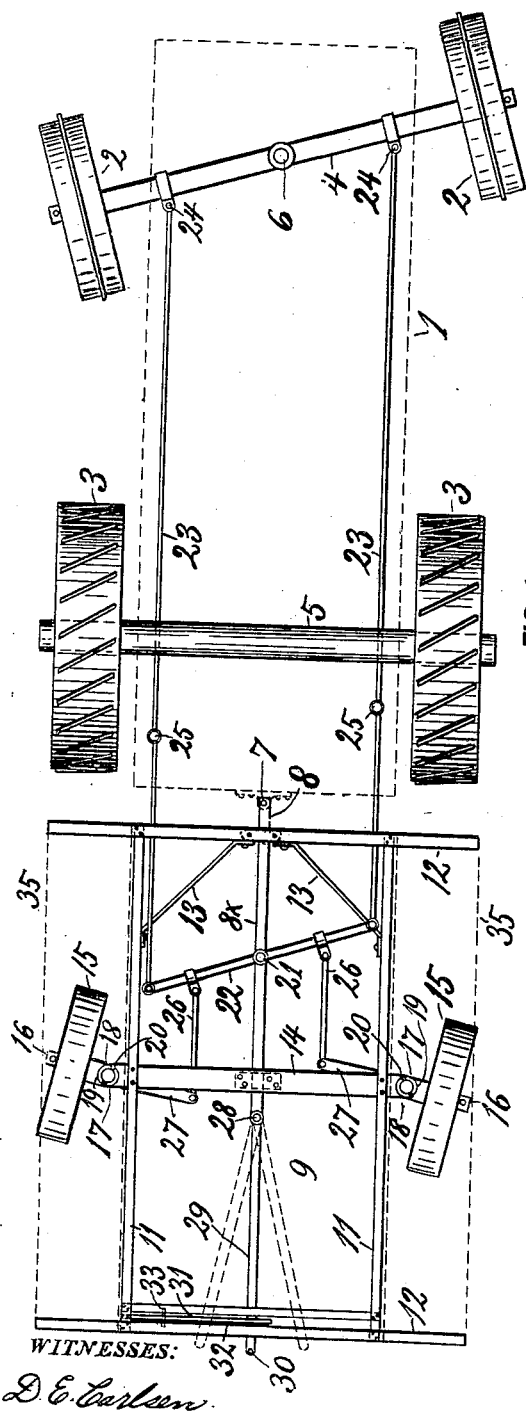
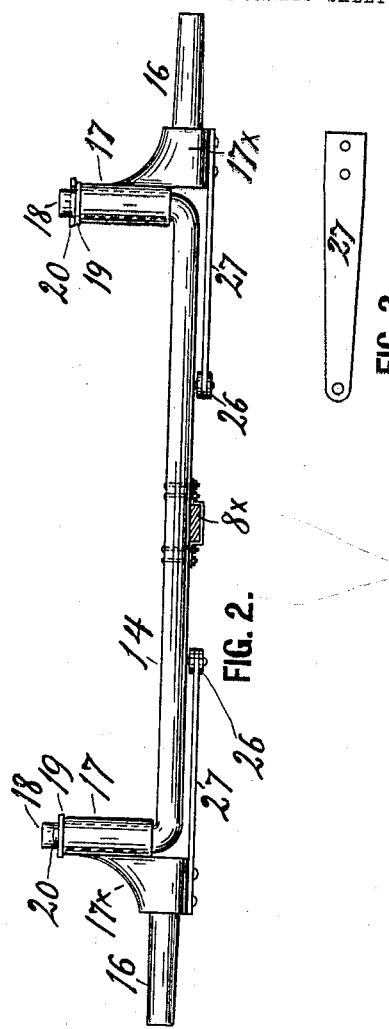
WITNESSES:
D. E. Carlsen.
L. E. Carlsen.
INVENTOR:
Martin Jorstad.
BY HIS ATTORNEY:
A. M. Carlsen.

No. 886,059. PATENTED APR. 28, 1908.
M. JORSTAD.
TENDER FOR TRACTION ENGINES.
APPLICATION FILED APR. 25, 1907.

2 SHEETS—SHEET 2.

WITNESSES:
D. E. Carlsen
L. C. Carlsen.

INVENTOR:
Martin Jorstad
BY his ATTORNEY:
A. M. Carlsen.

UNITED STATES PATENT OFFICE.

MARTIN JORSTAD, OF WALKER, MINNESOTA.

TENDER FOR TRACTION-ENGINES.

No. 886,059.  Specification of Letters Patent.  Patented April 28, 1908.

Application filed April 25, 1907. Serial No. 370,174.

*To all whom it may concern:*

Be it known that I, MARTIN JORSTAD, a citizen of the United States, residing at Walker, in the county of Cass and State of Minnesota, have invented a new and useful Tender for Traction-Engines, of which the following is a specification.

This invention relates to tenders for traction engines; and the objects are, first, to provide a more roomy and convenient tender than those heretofore used; second, to provide improved means for easy and proper steering of the wheels of the tender both in forward and backward motion of the traction engine. These and other objects I attain by the novel construction and arrangement of parts illustrated in the accompanying drawings, in which;—

Figure 4:
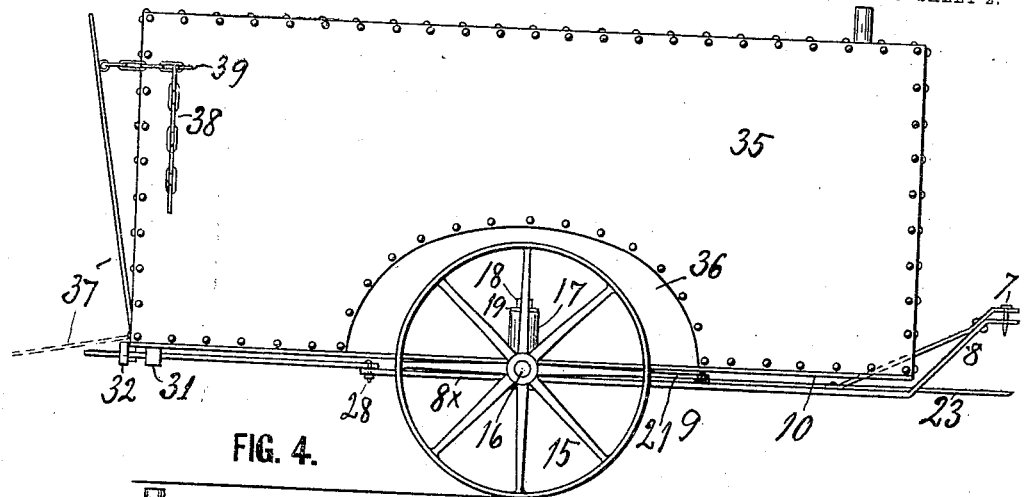
Figure 5:
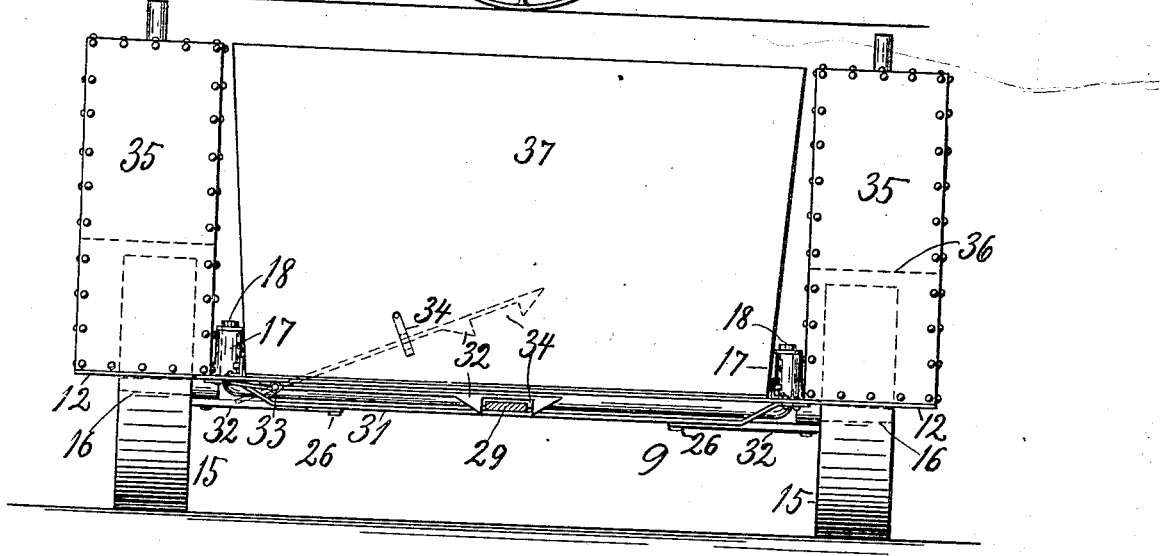

Figure 1 is a top or plan view of the traction gear and supporting wheels and lower frame of my improved tender and a traction engine drawing it, the body of the engine and the water tanks of the tender being indicated in dotted outlines. Fig. 2 is a rear elevation of the axle supporting the tender and some of the adjacent parts. Fig. 3 is a detail bottom view of one of the rocker arms seen below the ends of Fig. 2. Fig. 4 is a side elevation of the tender alone with the rear end gate partly opened. Fig. 5 is a rear end elevation of the tender.

Referring to the drawing by reference numerals, 1 designates the body, 2 the front steering wheels and 3 the traction wheels of a traction engine of which 4 is the front axle and 5 the rear axle. The latter axle is mounted in any suitable manner and the front axle has its middle pivoted at 6 so it swings horizontally, and is thus swung for steering by any suitable means (not shown).

To the rear end of the body 1 is detachably pivoted at 7 the front end of an upwardly offset coupling arm or member 8, which is formed of the end of a draft bar 8× secured to the bottom 10 of the tender 9, so that said bottom by said offset is lowered to convenient height for the fireman to stand on it, and fire with straw or other fuel in the furnace of the boiler. The tender has its frame work 11, 12, 13, supported and balanced on a single transverse axle 14 and wheels 15, said wheels are journaled on skeins 16 having sockets 17 journaled on vertically turned end portions 18 of the shaft, which are retained in the sockets by washers 19 and strong pins 20.

To the draft-bar 8× is pivoted at 21 a two-armed lever 22, to the ends of which are pivoted rods 23, having their front ends pivoted at 24 to the front axle 4 of the engine truck, said rods may have joints 25, especially if the front sections of the rods are guided to slide below the axle 5, as may be desirable in some cases. The lever 22 is also connected by links 26 to two rocker arms 27, secured to the lower part of the casting 17×, which unite the skein and the socket 17, so that when the front wheels 2 steer to either side, the wheels 15 of the tender will steer the latter to the opposite side and thus make the steering very easy.

Pivoted at 28 to the rear end of the draft bar is a link 29, having in its rear end a hole 30 adapted for engagement with the tongue or pole of the separator or threshing machine to be drawn by the engine. Said link 29 rests upon a horizontal bar 31 (see Fig. 5), where it may swing from side to side as the engine and tender turn to either side but in going down an incline the link cannot be allowed to thus swing and let the pole of the separator run against the wheels of the tender, for that reason an arm 32 is pivoted at 33 and adapted to engage with its notch 34 said link 29 and hold it in central position. When said arm or hook is not in use it is held suspended by a similar but smaller spring arm or catch 34 fixed on the tender.

35 are two water tanks for the feed water to the boiler. These tanks are secured upon the frame work of the tender one above each of its wheels 15, the tanks having arched spaces 36 in their lower portion for the wheels to move in. 37 is the regular hinged end-gate, which may be held open or more or less raised, or closed, by chains 38 and hooks 39.

From the above description it will be understood that the improved tender is easy to steer by the engineer on the engine, and it furnishes the right height for the fireman to work from, and it affords an unusually large space for carrying of fuel.

Having thus described my invention, what I claim is:—

1. A tender for traction engines, the same having supporting wheels and water tanks arranged above the wheels and formed with gaps or clearings for the wheels.

2. A tender for traction engines, the same having supporting wheels and water tanks arranged above the wheels and formed with gaps or clearings for the wheels, a floor supporting said tanks, a coupling member at the front end thereof, the same being offset upwardly so as to connect with the coupling member of a traction engine at a point higher than said floor.

In testimony whereof I affix my signature, in presence of two witnesses.

MARTIN JORSTAD.

Witnesses:
 R. D. LUNZ,
 PETER HANSEN.